(12) United States Patent
Chao et al.

(10) Patent No.: US 6,707,658 B2
(45) Date of Patent: Mar. 16, 2004

(54) SURGE PROTECTION AND RESET CIRCUIT

(75) Inventors: Yung-Hsiang Chao, Taipei (TW); Sung-Wen Chang, Taipei (TW); Ming-Yu Chang, Taipei (TW)

(73) Assignee: Delta Electronics, Inc., Taipei (TW)

( * ) Notice: Subject to any disclaimer, the term of this patent is extended or adjusted under 35 U.S.C. 154(b) by 361 days.

(21) Appl. No.: 09/855,168

(22) Filed: May 14, 2001

(65) Prior Publication Data

US 2002/0057547 A1 May 16, 2002

(30) Foreign Application Priority Data

Nov. 13, 2000 (TW) ........................................ 89124004 A

(51) Int. Cl.[7] .............................................. H02H 3/22
(52) U.S. Cl. ..................... 361/111; 361/93.1; 361/18; 361/88
(58) Field of Search ...................... 361/93.1, 88, 111, 361/718; 323/901, 908

(56) References Cited

U.S. PATENT DOCUMENTS 4,588,927 A * 5/1986 Kanno et al. ............... 315/307
5,925,990 A * 7/1999 Crouse et al. .............. 315/307

\* cited by examiner

Primary Examiner—Gregory J. Toatley, Jr.
Assistant Examiner—James A Demakis
(74) Attorney, Agent, or Firm—Mathews, Collins, Shepherd & McKay, P.A.

(57) ABSTRACT

A surge protection and reset circuit is provided for resetting a microprocessor to maintain a discharge lamp under a normal operating condition when the microprocessor is crashed owing to the cross talk or radiation effect in igniting a discharge lamp. The surge protection and reset circuit includes a ballast electrically connected to the discharge lamp for igniting the discharge lamp, a starting control circuit electrically connected to the ballast for triggering the ballast to ignite the discharge lamp and powering the ballast, a microprocessor electrically connected to the starting control circuit for initializing the starting control circuit when the microprocessor receives a lamp-state signal and a reset signal, and a reset circuit having an output terminal electrically connected to the microprocessor for providing the reset signal to reset the microprocessor when the reset circuit receives the lamp-state signal from a lamp-state terminal of the ballast.

9 Claims, 4 Drawing Sheets

SURGE PROTECTION AND RESET CIRCUIT

FIELD OF THE INVENTION

The present invention relates to a surge protection and reset circuit for a discharge lamp, and more particularly to a surge protection and reset circuit for resetting a microprocessor to maintain a discharge lamp under a normal operating condition when the microprocessor is crashed owing to the cross talk or radiation effect in igniting a high-pressure discharge lamp.

BACKGROUND OF THE INVENTION

FIG. 1 shows a typical starting circuit for a discharge lamp within a projector. Please refer to FIG. 1. The discharge lamp 3 is electrically connected to a ballast 2. The ballast 2 is used for igniting a discharge lamp 3 within a projector. The discharge lamp 3 can be a halogen lamp or an ultra high-pressure lamp. When a user wants to operate a projector, the first step is to turn on a start-up switch 11. The start-up switch 11 is electrically connected to an input terminal 1c of a microprocessor 1. When the start-up switch 11 is turned on, an input signal is generated and sent into the microprocessor 1. The microprocessor 1 has one output terminal 1a which is electrically connected to an input terminal 121 of a buffer circuit 12. The buffer circuit 12 includes a transistor $Q_a$ and a plurality of resistors. The buffer circuit 12 is also an inverter. When an output signal from an output terminal 1a of the microprocessor 1 is a high level, an output signal from an output terminal 120 of the buffer circuit 12 is a low level.

The output terminal 120 of the buffer circuit 12 is electrically connected to an input terminal 2a of the ballast 2. When the ballast 2 receives an output signal from the output terminal 120 of the buffer circuit 12, the ballast 2 generates a high pressure voltage on output terminals 2c and 2d of the ballast 2 to ignite the discharge lamp 3. And then an output terminal 2b of the ballast 2 outputs a voltage signal to an input terminal 1b of the microprocessor 1. After the discharge lamp 3 is lighted, the terminals of 2c and 2d of the ballast 2 return to an ordinary voltage.

The instantaneous high-pressure surge current will generate the radiation and cross talk effect so that the microprocessor 1 accessing the data information form a RAM or ROM may be interrupted and the microprocessor 1 will cause a wrong result. Therefore, the microprocessor 1 will be shut down.

It is therefore attempted by the applicant to deal with the above situation encountered with the prior art.

SUMMARY OF THE INVENTION

It is therefore an object of the present invention to propose a surge protection and reset circuit for resetting a microprocessor to maintain a discharge lamp under a normal operating condition when the microprocessor is crashed owing to the cross talk or radiation effect in igniting a high-pressure discharge lamp. The surge protection and reset circuit for a discharge lamp includes a ballast, a starting control circuit, a microprocessor, and a reset circuit. The ballast is electrically connected to the discharge lamp for igniting the discharge lamp. The starting control circuit is electrically connected to the ballast for triggering the ballast to ignite the discharge lamp and powering the ballast. The microprocessor is electrically connected to the starting control circuit for initializing the starting control circuit when the microprocessor receives a lamp-state signal and a reset signal. The reset circuit has an output terminal electrically connected to the microprocessor for providing the reset signal to reset the microprocessor when the reset circuit receives the lamp-state signal from a lamp-state terminal of the ballast.

According to an aspect of the present invention, the surge protection and reset circuit further includes a first voltage regulator electrically connected to the microprocessor and the starting control circuit for providing a first voltage level to the starting control circuit when the microprocessor outputs a first control signal to the first voltage regulator.

Preferably, the microprocessor outputs the first control signal when the microprocessor receives the lamp-state signal.

Preferably, the microprocessor has a reset terminal electrically connected to the output terminal of the reset circuit.

Preferably, the reset circuit includes a first transistor, a second resistor, and at least one first capacitor. The first transistor has a base terminal electrically connected to one end of a first resistor, and the other end of the first resistor electrically connected to the lamp-state terminal. The second resistor has one end electrically connected to an collector terminal of the first transistor, and the other end of the second resistor being ground. At least one first capacitor is electrically connected to an emitter terminal of the first transistor and a voltage supply, and the other end of the at least one first capacitor is electrically connected to the reset terminal of the microprocessor.

Preferably, the starting control circuit includes a silicon control rectifier (SCR), a third resistor, a fourth resistor, a fifth resistor, and a sixth resistor. The silicon control rectifier (SCR) has a first terminal electrically connected to the output terminal of the first voltage regulator. The third resistor has one end electrically connected to a second terminal of the silicon control rectifier, and the other end of the third resistor is electrically connected to a fourth resistor. The fifth resistor has one end electrically connected to an intersection of the third resistor and the fourth resistor and the other end of the fifth resistor electrically connected to a third terminal of the silicon control rectifier, wherein the intersection is the output terminal of the starting control circuit. The sixth resistor has one end electrically connected to the third terminal of the silicon control rectifier and the other end electrically connected to the microprocessor.

Preferably, the starting control circuit further includes a buffer and inverting circuit mounted between the microprocessor and the sixth resistor for increasing a fan-out current and providing a trigger signal to the third terminal of the silicon control rectifier.

Preferably, the buffer and inverting circuit includes a second transistor, a seventh resistor, an eighth resistor, and a ninth resistor. The seventh resistor has one end electrically connected to the output terminal of the microprocessor. The second transistor has a base terminal electrically connected to the other end of the seventh resistor and a collector terminal electrically connected to the sixth resistor. The ninth resistor has one end electrically connected to an emitter terminal of the second transistor and the other end electrically connected to a voltage supply. The eighth resistor has one end electrically connected to a collector terminal of the second transistor and the other end electrically connected to ground.

Preferably, the surge protection and reset circuit further includes a second voltage regulator having a control terminal electrically connected to the lamp-state terminal of the ballast and having an output terminal electrically connected to an application-specific integrated circuit (ASIC) for providing a second voltage level to the application-specific integrated circuit when the lamp-state terminal of the ballast outputs the lamp-state signal to the control terminal of the second voltage regulator.

Preferably, the surge protection and reset circuit further includes an OR gate logic circuit, a third voltage regulator, and a fan. The OR gate logic circuit has two input terminals electrically connected to the application-specific integrated circuit (ASIC) respectively and the output terminal of the starting control circuit. The third voltage regulator has a control terminal electrically connected to an output terminal of the OR gate logic circuit for providing a third voltage level when the third voltage regulator receives a signal from the OR gate logic circuit. The fan is electrically connected to an output terminal of the third voltage regulator for dissipating heat of the surge protection and reset circuit when the fan receives the third voltage level.

The present invention may best be understood through the following description with reference to the accompanying drawings, in which:

DESCRIPTION OF THE PREFERRED EMBODIMENTS

Figure 1:
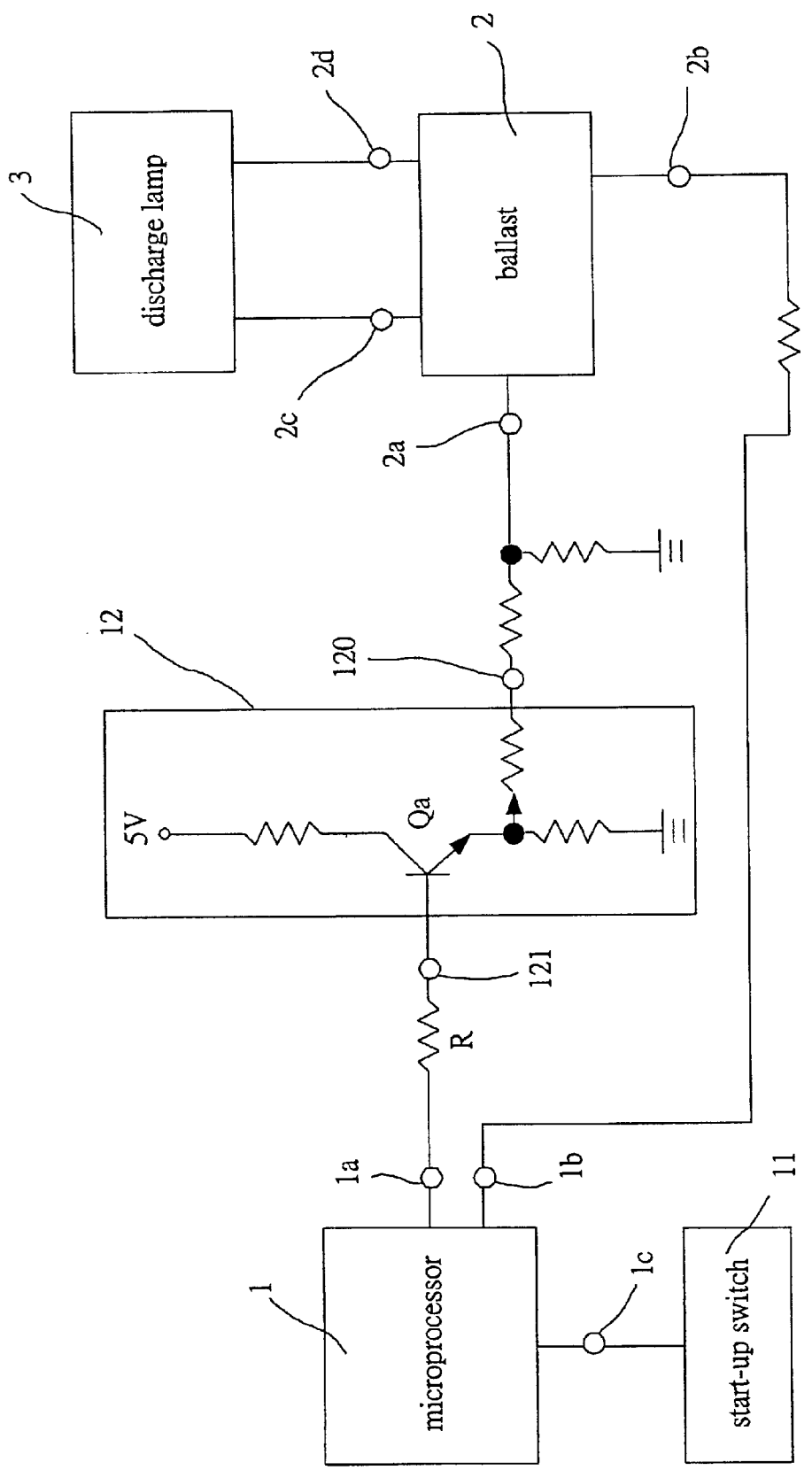
FIG. 1 illustrates a typical starting circuit for a discharge lamp within a projector.
Figure 2:
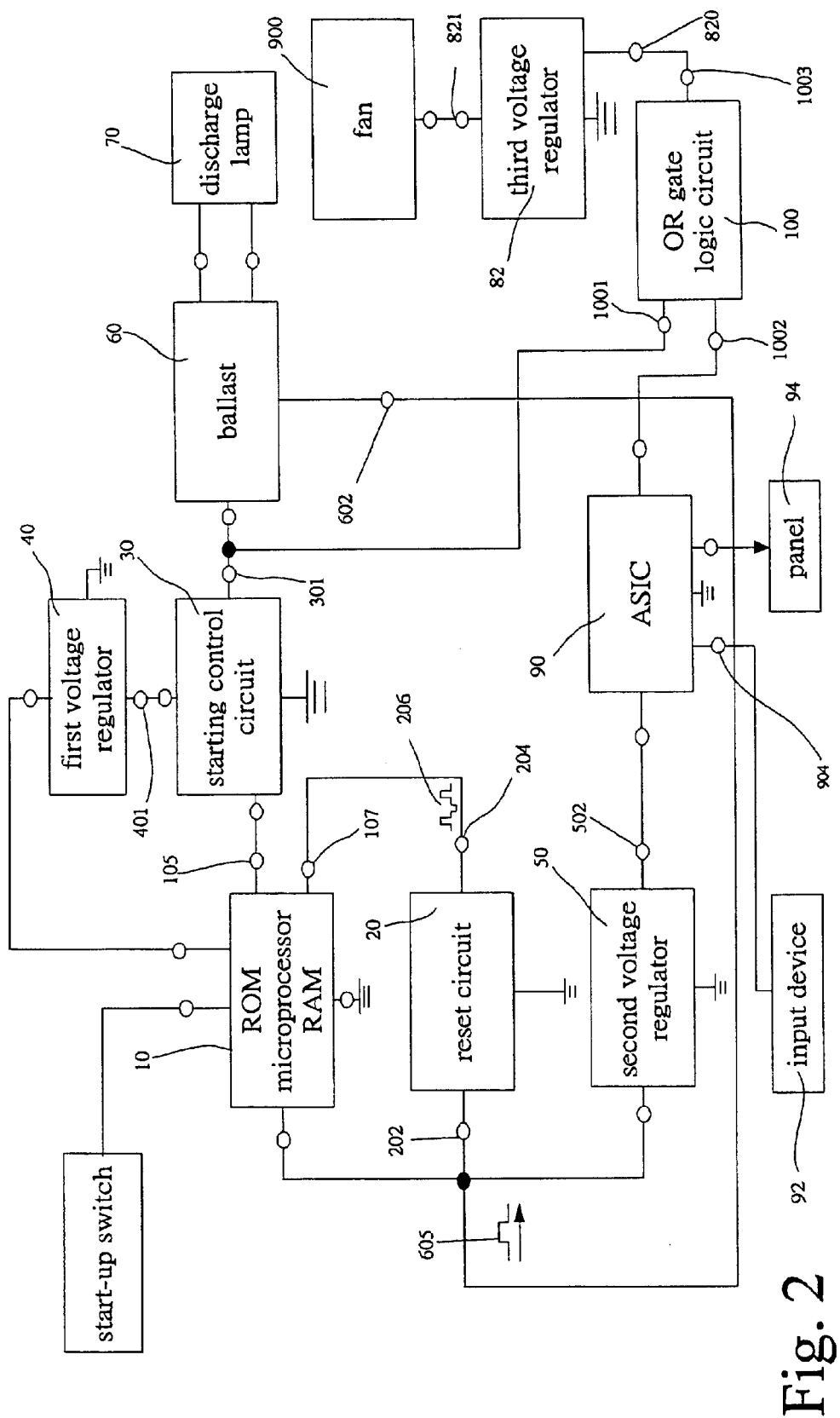
FIG. 2 is a schematic block diagram illustrating a surge protection and reset circuit for a discharge lamp according to the first preferred embodiment of the present invention.
Figure 3:
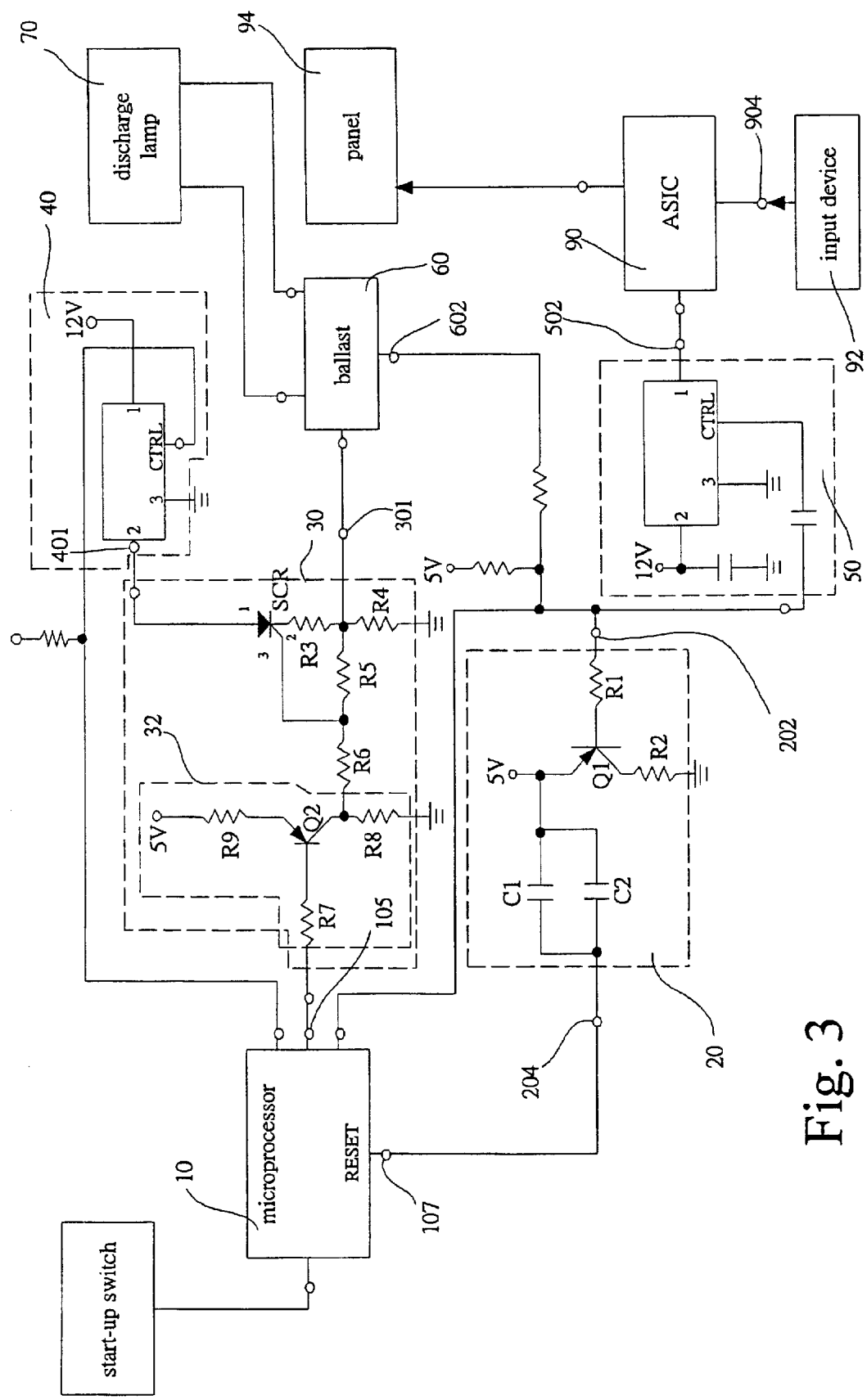
FIG. 3 is a circuit diagram illustrating the surge protection and reset circuit in FIG. 2.

FIG. 2 is a block schematic diagram illustrating a surge protection and reset circuit for a discharge lamp according to the first preferred embodiment of the present invention. FIG. 3 is a circuit diagram illustrating the surge protection and reset circuit in FIG. 2. Please refer to FIG. 2 and FIG. 3. The surge protection and reset circuit for a discharge lamp includes a ballast 60, a starting control circuit 30, a microprocessor 10, and a reset circuit 20. The ballast 60 is electrically connected to the discharge lamp 70 for igniting the discharge lamp 70. The starting control circuit 30 is electrically connected to the ballast 60 for triggering the ballast 60 to ignite the discharge lamp 70 and powering the ballast 70. The microprocessor 10 is electrically connected to the starting control circuit 30 for initializing the starting control circuit 30 when the microprocessor 10 receives a lamp-state signal 605 and a reset signal 206. The reset circuit 20 has an output terminal 204 electrically connected to the microprocessor 10 for providing the reset signal 206 to reset the microprocessor 10 when the reset circuit 20 receives the lamp-state signal 605 from a lamp-state terminal 602 of the ballast 60.

However, the surge protection and reset circuit further includes a first voltage regulator 40 electrically connected to the microprocessor 10 and the starting control circuit 30 for providing a first voltage level to the starting control circuit 30 when the microprocessor 10 outputs a first control signal to the first voltage regulator 40. Meanwhile, the microprocessor 10 outputs the first control signal when the microprocessor 10 receives the lamp-state signal 605. The first voltage regulator 40 can be the industry SHARP IC 05D211.

The microprocessor 10 has a reset terminal 107 electrically connected to the output terminal 204 of the reset circuit 20. The reset circuit 20 includes a first transistor $Q_1$, a second resistor R2, and at least one first capacitor C1. The first transistor $Q_1$ has a base terminal electrically connected to one end of a first resistor R1, and the other end 202 of the first resistor R1 electrically connected to the lamp-state terminal 602. The second resistor R2 has one end electrically connected to a collector terminal of the first transistor $Q_1$, and the other end of the second resistor R2 being ground. At least one first capacitor C1 is electrically connected to an emitter terminal of the first transistor $Q_1$ and a voltage supply 5V, and the other end 204 of at least one first capacitor C1 is electrically connected to the reset terminal 107 of the microprocessor 10. The starting control circuit 30 includes a silicon control rectifier SCR, a third resistor R3, a fourth resistor R4, a fifth resistor R5, and a sixth resistor R6. The silicon control rectifier SCR has a first terminal electrically connected to the output terminal 401 of the first voltage regulator 40. The third resistor R3 has one end electrically connected to a second terminal of the silicon control rectifier SCR, and the other end of the third resistor R3 is electrically connected to a fourth resistor R4. The fifth resistor R5 has one end electrically connected to an intersection of the third resistor R3 and the fourth resistor R4 and the other end of the fifth resistor R5 electrically connected to a third terminal of the silicon control rectifier SCR, wherein the intersection is the output terminal 301 of the starting control circuit 30. The sixth resistor R6 has one end electrically connected to the third terminal of the silicon control rectifier SCR and the other end electrically connected to the microprocessor 10. The starting control circuit 30 further includes a buffer and inverting circuit 32 mounted between the microprocessor 10 and the sixth resistor R6 for increasing a fan-out current and providing a trigger signal to the third terminal of the silicon control rectifier SCR. The buffer and inverting circuit 32 includes a second transistor $Q_2$, a seventh resistor R7, an eighth resistor R8, and a ninth resistor R9. The seventh resistor R7 has one end 302 electrically connected to the output terminal 105 of the microprocessor 10. The second transistor $Q_2$ has a base terminal electrically connected to the other end of the seventh resistor R7 and a collector terminal electrically connected to the sixth resistor R6. The ninth resistor R9 has one end electrically connected to an emitter terminal of the second transistor $Q_2$ and the other end electrically connected to a voltage supply 5V. The eighth resistor R8 has one end electrically connected to a collector terminal of the second transistor $Q_2$ and the other end electrically connected to ground. The surge protection and reset circuit further includes a second voltage regulator 50 having a control terminal CTRL electrically connected to the lamp-state terminal 602 of the ballast 60 and having an output terminal 502 electrically connected to an application-specific integrated circuit (ASIC) 90 for providing a second voltage level to the application-specific integrated circuit 90 when the lamp-state terminal 602 of the ballast 60 outputs the lamp-state signal 605 to the control terminal CTRL of the second voltage regulator 50. The surge protection and reset circuit further includes an OR gate logic circuit 100, a third voltage regulator 82, and a fan 900. The OR gate logic circuit 100 has two input terminals 1001,1002 electrically connected to the application-specific integrated circuit (ASIC) 90 respectively and the output terminal 301 of the starting control circuit 30. The third voltage regulator 82 has a control terminal 820 electrically connected to an output terminal 1003 of the OR gate logic circuit 100 for providing a third voltage level when the third voltage regulator 82 receives a signal from the OR gate logic circuit 100. The fan 900 is electrically connected to an output terminal 821 of the third voltage regulator 82 for dissipating heat of the surge protection and reset circuit when the fan 900 receives the third voltage level. The second voltage regulator 50 and the third voltage regulator 82 can be the industry SHARP IC 05D211.

Meanwhile, an input terminal 904 of the application-specific integrated circuit (ASIC) 90 is electrically connected to an input device 92 (i.e. a personal computer). When the input device 92 outputs a signal into the application-specific integrated circuit (ASIC) 90, the application-specific integrated circuit (ASIC) 90 will process the signal and output to a liquid crystal panel 94. The application-specific integrated circuit (ASIC) 90 also includes several types of memory. The application-specific integrated circuit (ASIC) 90 may be interrupted by the surge current effect causing the application-specific integrated circuit (ASIC) 90 shut down. Therefore, the lamp-state signal 605 can trigger the second voltage regulator 50 to recovery the application-specific integrated circuit (ASIC) 90 back to a normal operating condition.

Figure 4:
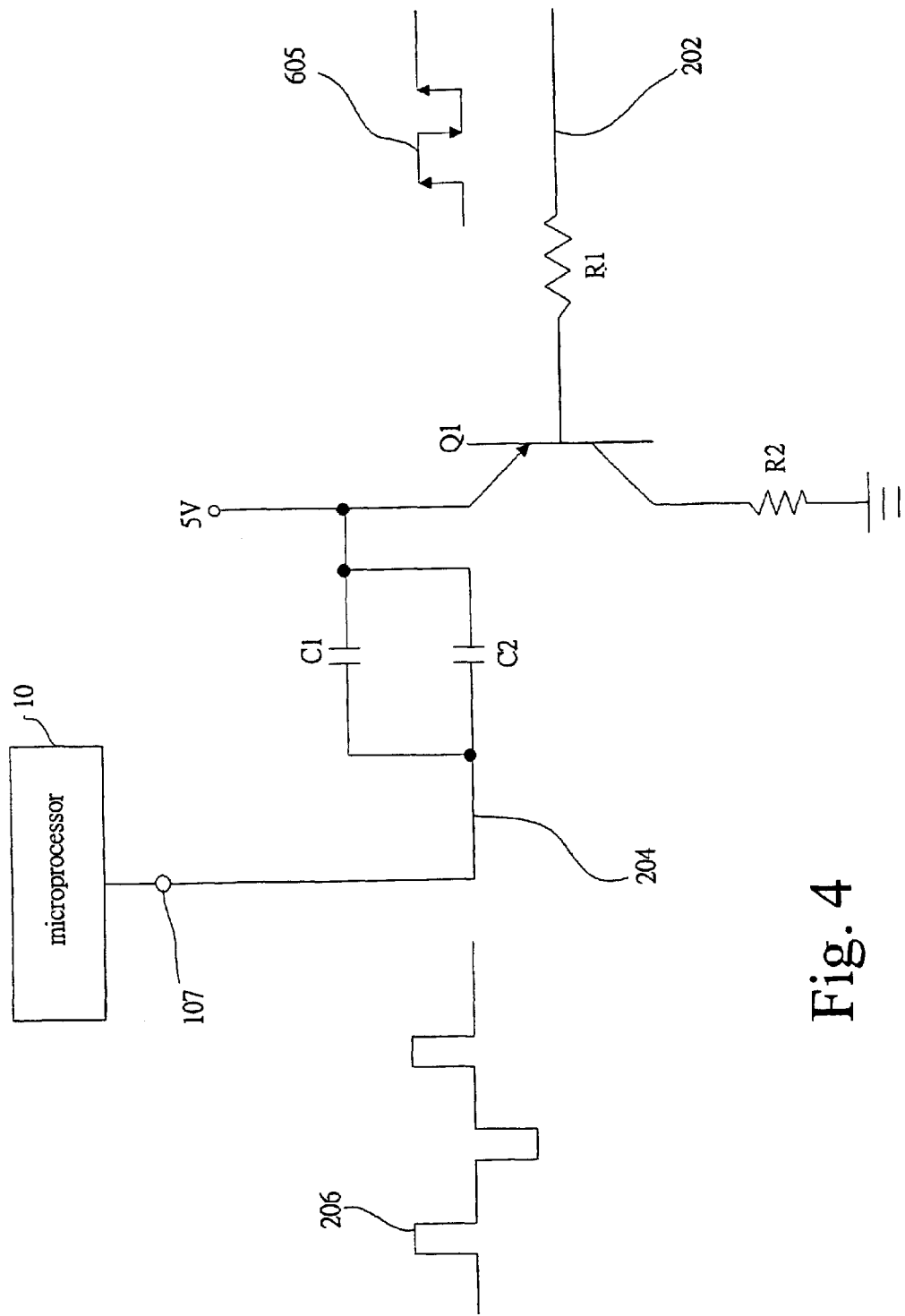
FIG. 4 is a signal diagram with reference to the reset circuit and the microprocessor.

FIG. 4 is a signal diagram with reference to the reset circuit and the microprocessor. As shown in FIG. 4, the parallel capacitors of C1 and C2 are a differentiator. The lamp-state signal 605 is transferred to the reset signal 206 by the differentiator.

In sum, the surge protection and reset circuit resets a microprocessor to maintain a discharge lamp under a normal operating condition when the microprocessor is crashed owing to the cross talk or radiation effect in igniting a high-pressure discharge lamp.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A surge protection and reset circuit for a discharge lamp comprising:
   a ballast electrically connected to said discharge lamp;
   a starting control circuit electrically connected to said ballast to ignite said discharge lamp and powering said;
   a microprocessor electrically connected to said starting control circuit for initializing said starting control circuit when said microprocessor receives a lamp-state signal and a reset signal; and
   a reset circuit having an output terminal electrically connected to said microprocessor for providing said reset signal to reset said microprocessor when said reset circuit receives said lamp-state signal from a lamp-state terminal of said ballast, wherein said reset circuit comprises;
   a first transistor having a base terminal electrically connected to one end of a first resistor, the other end of said resistor electrically connected to said lamp-state terminal;
   a second resistor having one end electrically connected to a collector terminal of said first transistor, and the other end of said second resistor being grounded; and
   at least one first capacitor electrically connected to an emitter terminal of said first transistor and a voltage supply, and the other end of said at least one first capacitor electrically connected to said reset terminal of said microprocessor.

2. The surge protection and reset circuit according to claim 1, wherein said surge protection and reset circuit further comprises a first voltage regulator electrically connected to said microprocessor and said starting control circuit for providing a first voltage level to said starting control circuit when said microprocessor outputs a first control signal to said first voltage regulator.

3. The surge protection and reset circuit according to claim 2, wherein said microprocessor outputs said first control signal when said microprocessor receives said lamp-state signal.

4. The surge protection and reset circuit according to claim 1, wherein said microprocessor has a reset terminal electrically connected to said output terminal of said reset circuit.

5. The surge protection and reset circuit according to claim 1, wherein said starting control circuit comprises:
   a silicon control rectifier (SCR) having a first terminal electrically connected to said output terminal of said first voltage regulator;
   a third resistor having one end electrically connected to a second terminal of said silicon control rectifier, and the other end of said third resistor electrically connected to a fourth resistor;
   a fifth resistor having one end electrically connected to an intersection of said third resistor and said fourth resistor and the other end of said fifth resistor electrically connected to a third terminal of said silicon control rectifier, wherein said intersection is said output terminal of said starting control circuit; and
   a sixth resistor having one end electrically connected to said third terminal of said silicon control rectifier and the other end electrically connected to said microprocessor.

6. The surge protection and reset circuit according to claim 5, wherein said starting control circuit further comprises a buffer and inverting circuit mounted between said microprocessor and said sixth resistor for increasing a fan-out current and providing a trigger signal to said third terminal of said silicon control rectifier.

7. The surge protection and reset circuit according to claim 6, wherein said buffer and inverting circuit comprises:
   a seventh resistor having one end electrically connected to said output terminal of said microprocessor;
   a second transistor having a base terminal electrically connected to the other end of said seventh resistor and a collector terminal electrically connected to said sixth resistor;
   a ninth resistor having one end electrically connected to an emitter terminal of said second transistor and the other end electrically connected to a voltage supply; and
   an eighth resistor having one end electrically connected to a collector terminal of said second transistor and the other end electrically connected to ground.

8. The surge protection and reset circuit according to claim 1, wherein said surge protection and reset circuit further comprises a second voltage regulator having a control terminal electrically connected to said lamp-state terminal of said ballast and having an output terminal electrically connected to an application-specific integrated circuit (ASIC) for providing a second voltage level to said application-specific integrated circuit when said lamp-state terminal of said ballast outputs said lamp-state signal to said control terminal of said second voltage regulator.

9. The surge protection and reset circuit according to claim 8, wherein said surge protection and reset circuit further comprises:

an OR gate logic circuit having two input terminals electrically connected to said application-specific integrated circuit (ASIC) respectively and said output terminal of said starting control circuit;

a third voltage regulator having a control terminal electrically connected to an output terminal of said OR gate logic circuit for providing a third voltage level when said third voltage regulator receives a signal from said OR gate logic circuit; and a fan electrically connected to an output terminal of said third voltage regulator for dissipating heat of said surge protection and reset circuit when said fan receives said third voltage level.

* * * * *